United States Patent
Atkins et al.

(10) Patent No.: US 12,041,310 B2
(45) Date of Patent: *Jul. 16, 2024

(54) IN-FLIGHT ENTERTAINMENT SYSTEMS AND METHODS

(71) Applicant: Rockwell Collins, Inc., Cedar Rapids, IA (US)

(72) Inventors: Steven C. Atkins, Anaheim, CA (US);
Robert V. Troxel, Brea, CA (US);
Jeffrey B. Whitney, Irvine, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/125,268

(22) Filed: Dec. 17, 2020

(65) Prior Publication Data

US 2021/0105536 A1 Apr. 8, 2021

Related U.S. Application Data

(62) Division of application No. 15/663,490, filed on Jul. 28, 2017, now Pat. No. 10,897,652.

(Continued)

(51) Int. Cl.
*H04N 21/472* (2011.01)
*H04N 21/2387* (2011.01)
(Continued)

(52) U.S. Cl.
CPC ... *H04N 21/47217* (2013.01); *H04N 21/2387* (2013.01); *H04N 21/41422* (2013.01);
(Continued)

(58) Field of Classification Search
CPC ......... H04N 21/47217; H04N 21/2387; H04N 21/41422; H04N 21/4302; H04N 21/436;
(Continued)

(56) References Cited

U.S. PATENT DOCUMENTS 9,467,359 B1 * 10/2016 Januszewski ......... H04L 67/146
9,876,834 B2    1/2018 Januszewski
(Continued)

*Primary Examiner* — John W Miller
*Assistant Examiner* — Akshay Doshi
(74) *Attorney, Agent, or Firm* — Suiter Swantz IP

(57) ABSTRACT

Embodiments of the inventive concepts disclosed herein are directed to systems and methods of providing in-flight entertainment related content. A content server may upload first content to in-seat client terminals for local storage and subsequent playback. The content server may upload second content to overhead client terminals for local storage and subsequent playback. Each client terminal may synchronize to a defined reference point for initiating playback of the first content and of the second content. Each client terminal may operate independently of each other and the content server subsequent to initiation of the playback. Subsequent to the initiation of the playback and in response to a system disruption to the playback at a client terminal, the client terminal may resume the playback of the corresponding content at the client terminal at a point at which the disruption occurred. The resumption may be independent of the playback in other client terminals.

14 Claims, 5 Drawing Sheets

Related U.S. Application Data

(60) Provisional application No. 62/368,889, filed on Jul. 29, 2016.

(51) Int. Cl.
*H04N 21/414* (2011.01)
*H04N 21/43* (2011.01)
*H04N 21/436* (2011.01)
*H04N 21/439* (2011.01)
*H04N 21/44* (2011.01)

(52) U.S. Cl.
CPC ....... *H04N 21/4302* (2013.01); *H04N 21/436* (2013.01); *H04N 21/439* (2013.01); *H04N 21/44* (2013.01)

(58) Field of Classification Search
CPC .. H04N 21/439; H04N 21/44; H04N 21/4325; H04N 21/4331; H04N 21/632; H04N 21/2146
See application file for complete search history.

(56) References Cited

U.S. PATENT DOCUMENTS

| | | | |
|---|---|---|---|
| 2008/0235746 A1* | 9/2008 | Peters | H04N 21/4627 |
| | | | 348/E7.071 |
| 2009/0259765 A1* | 10/2009 | Karlsson | H04L 65/65 |
| | | | 709/231 |
| 2010/0138582 A1* | 6/2010 | Bird | H04H 20/62 |
| | | | 709/233 |
| 2010/0185753 A1 | 7/2010 | Liu et al. | |
| 2011/0039508 A1* | 2/2011 | Lindahl | H04H 40/18 |
| | | | 713/320 |
| 2013/0124679 A1 | 5/2013 | Harrang et al. | |
| 2014/0006478 A1* | 1/2014 | Eguchi | H04L 65/61 |
| | | | 709/203 |
| 2015/0033272 A1 | 1/2015 | Ganesan et al. | |
| 2016/0028846 A1 | 1/2016 | Coglitore et al. | |
| 2016/0037196 A1 | 2/2016 | Peters et al. | |
| 2016/0173650 A1 | 6/2016 | Hala et al. | |
| 2017/0041238 A1* | 2/2017 | Do | H04L 47/2416 |
| 2017/0118523 A1* | 4/2017 | Gupta | H04N 21/278 |
| 2017/0134792 A1 | 5/2017 | Moyer et al. | |
| 2018/0007161 A1* | 1/2018 | Hwang | H04L 67/5681 |
| 2018/0034873 A1 | 2/2018 | Brown et al. | |

* cited by examiner

IN-FLIGHT ENTERTAINMENT SYSTEMS AND METHODS

CROSS REFERENCES TO RELATED APPLICATIONS

This application claims the benefit and priority under 35 U.S.C. § 119(e) to U.S. Provisional Application No. 62/368,889, titled "IN-FLIGHT ENTERTAINMENT SYSTEMS AND METHODS," filed Jul. 29, 2016, which is incorporated herein in its entirety.

BACKGROUND

In-flight information distribution systems may present an occupant or passenger of an aircraft with a variety of in-flight entertainment content. In such systems, a client terminal may cache a local copy of the content. The client terminal, however, may occasionally undergo system outages or disruptions leading to the deletion or corruption of the cache local copy. Re-uploading of the content onto each client terminal may consume significant computing resources and extensive amount of time to complete, rendering the client terminal unavailable for operation by the end user for hours or even days at a time.

SUMMARY

In one aspect, embodiments of the inventive concepts disclosed herein are directed to a system for providing in-flight entertainment related content. The system may include a plurality of client terminals operating in a passenger cabin of an aircraft. The plurality of client terminals may include a plurality of in-seat client terminals and a plurality of overhead client terminals. The system may include a content server operating in the aircraft. The content server may upload first content to the plurality of in-seat client terminals for local storage and subsequent playback at each in-seat client terminal. The content server may upload second content to the plurality of overhead client terminals for local storage and subsequent playback at each overhead client terminal. Each client terminal of the plurality of in-seat client terminals and the plurality of overhead client terminals may synchronize to a defined reference point for initiating playback of the first content and of the second content. Each client terminal of the plurality of in-seat client terminals and the plurality of overhead client terminals may operate independently of each other and the content server subsequent to initiation of the playback. Subsequent to the initiation of the playback and in response to a system disruption to the playback at a client terminal of the plurality of in-seat client terminals or the plurality of overhead client terminals, the client terminal may resume the playback of the corresponding content at the client terminal at a point at which the disruption occurred. The resumption may be independent of the playback in other client terminals of the plurality of client terminals.

In some embodiments, the client terminal may determine, in response to a request to playback third content at the client terminal, that upload of the third content to the client terminal for local storage is not complete. In some embodiments, the client terminal may request streaming of the third content from the content server to initiate the playback, responsive to the determination. In some embodiments, the client terminal may playback the third content via streaming from the content server. In some embodiments, the client terminal may, concurrent to the streaming, upload at least a portion of the third content for local storage at the client terminal, via data transfer from the content server separate from the streaming.

In some embodiments, the client terminal may determine, in response to a system disruption to playback of third content at the client terminal, that at least a portion of the third content stored at the client terminal is missing or corrupted. In some embodiments, the client terminal may request the third content from a second client terminal of the plurality of client terminals located proximate to the client terminal, responsive to the determination.

In some embodiments, the client terminal may determine, in response to a system disruption to playback of third content at the client terminal, that at least a portion of the third content stored at the client terminal is lost or corrupted. In some embodiments, the client terminal may request streaming of the third content from the content server for playback, responsive to the determination.

In some embodiments, the plurality of client terminals may further include a plurality of passenger client terminals. In some embodiments, the content server may stream, on demand, third content to at least one passenger client terminal of the plurality of passenger client terminals for playback independent of other client terminals of the plurality of client terminals. In some embodiments, the content server is further configured to upload the first content to each in-seat client terminal of the plurality of in-seat client terminals according to an order of upload based on relative proximity of each of the in-seat client terminals to the content server. In some embodiments, the first content may include audio content and the second content may include video content.

In one aspect, embodiments of the inventive concepts disclosed herein are directed to a system for providing in-flight entertainment related content. The system may include an overhead client terminal operating in a passenger cabin of an aircraft. The overhead client terminal may download, from a content server, first content for local storage and subsequent playback at the overhead client terminal. The system may include an in-seat client terminal operating in the passenger cabin of the aircraft. The in-seat client terminal may download, from the content server, second content for local storage and subsequent playback at the in-seat client terminal. The overhead client terminal and the in-seat client terminal may synchronize to a defined reference point for initiation of playback of the first content and the second content. The overhead client terminal and the in-seat client terminal may operate independently of each other and of the content server subsequent to the initiation of the playback. One of the overhead client terminal or the in-seat client terminal, subsequent to the initiation of the playback and in response to a system disruption of the playback of the corresponding content at the respective client terminal, may resume the playback of the corresponding content at the respective client terminal from a point at which the system disruption occurred. The resumption may be independent of the playback in the other client terminal.

In some embodiments, the in-seat client terminal may determine, responsive to the system disruption of the playback of the second content, that at least a portion of the second content stored at the in-seat client terminal is missing or corrupted. In some embodiments, the in-seat client terminal may identify, responsive to the determination that the at least a portion of the second content is missing or corrupted, that a second in-seat client terminal is located proximate to the in-seat client terminal. In some embodiments, the in-seat client terminal may request the second content from the second in-seat client terminal located proximate to the in-seat client terminal.

In some embodiments, the in-seat client terminal may detect a system disruption to downloading of the second content to the in-seat client terminal. In some embodiments, the in-seat client terminal may determine the point at which the system disruption to the downloading occurred. In some embodiments, the in-seat client terminal may resume the downloading of the second content from the point determined to be at which the system disruption to downloading occurred. The resumption may be independent of the download of the first content to the overhead client terminal.

In some embodiments, the in-seat client terminal may receive, during downloading of third content from the content server, a request to playback the third content. In some embodiments, the in-seat client terminal may stream, responsive to the receipt of the request to playback the third content, the third content from one of the content server or a client terminal proximate to the in-seat client terminal, and to initiate the playback of the third content streamed to the in-seat client terminal, separate from the downloading of the third content for local storage at the in-seat client terminal.

In some embodiments, the in-seat client terminal may receive, prior to completion of the downloading of the second content from the content server, a request to playback the second content. In some embodiments, the in-seat client terminal may stream, responsive to the receipt of the request to playback, the second content from one of the content server or a client terminal proximate to the in-seat client terminal, and to initiate playback of the second content streamed to the in-seat client terminal, separate from the downloading of the second content for local storage at the in-seat client terminal.

In some embodiments, the in-seat client terminal may include an in-seat display unit and an in-seat audio unit. In some embodiments, the in-seat client terminal may download the second content. The second content may include second video content and audio content. In some embodiments, the overhead client terminal may include an overhead display unit. In some embodiments, the overhead client terminal may download the first content. The first content may include first video content.

In one aspect, embodiments of the inventive concepts disclosed herein are directed to a method of providing in-flight entertainment related content. A content server operating in an aircraft may upload, to each client terminal of a plurality of client terminals operating in a passenger cabin of the aircraft, content for local storage and subsequent playback at the respective client terminal. Each client terminal may synchronize with one another to a defined reference point for initiating playback. Each client terminal may operate independently of one another and of the content server subsequent to initiating the playback. The content server may identify a point at which a system disruption occurred at a client terminal from the plurality of client terminals during the playback of the content at the client terminal. The content server may stream, to the client terminal, the content from the point at which the system disruption occurred at the client terminal during the playback of the content.

In some embodiments, identifying the point may include receiving, from the client terminal, a request to stream the content from the point at which the system disruption occurred at the client terminal. The request may be transmitted by the client terminal subsequent to determining that at least a portion of the content stored at the client terminal is lost or corrupted. In some embodiments, streaming the content may include streaming the content to the client terminal, responsive to receiving the request.

In some embodiments, uploading the content may include uploading audio content to a first subset of the plurality of client terminals. Each of the first subset of client terminals may include an in-seat client terminal. In some embodiments, uploading the content may include uploading visual content to a second subset of the plurality of client terminals. Each of the second subset of client terminals may include an overhead client terminal. In some embodiments, uploading the content may include uploading audiovisual content to a third subset of the plurality of client terminals. Each of the third subset of client terminals may include a passenger client terminal.

In some embodiments, the content server may upload, to each client terminal of a plurality of client terminals, second content for local storage and subsequent playback at the respective client terminal. In some embodiments, the content server may identify a second point at which a second system disruption occurred at a second client terminal from the plurality of client terminals during the uploading of the second content for local storage and subsequent playback at the client terminal. In some embodiments, the content server may transmit a first command to the second client terminal. The first command may identify a third client terminal from which the second client terminals is to request the second content. Receipt of the first command may cause the second client terminal to send a request to the third client terminal to stream the second content to the second client terminal. In some embodiments, the content server may transmit a second command to the third client terminal. Receipt of the command may cause the third client terminal to stream the second content to the second client terminal.

In some embodiments, the content server may identify an order of upload of the content onto each client terminal of the plurality of client terminals based on a relative proximity of each client terminal of the plurality of client terminals to the content server. In some embodiments, uploading the content may include uploading the content to each client terminal of the plurality of client terminals in accordance with the order of upload.

In some embodiments, the content server may receive, from a second client terminal of the plurality of client terminals, a request to stream second content to initiate playback. The request to stream the second content may be transmitted by the second client terminal responsive to determining that the second content is not uploaded at the second client terminal. In some embodiments, the content server may stream, to the second client terminal, the second content responsive to receiving the request to stream the second content, concurrent to uploading the content to the second client terminal.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
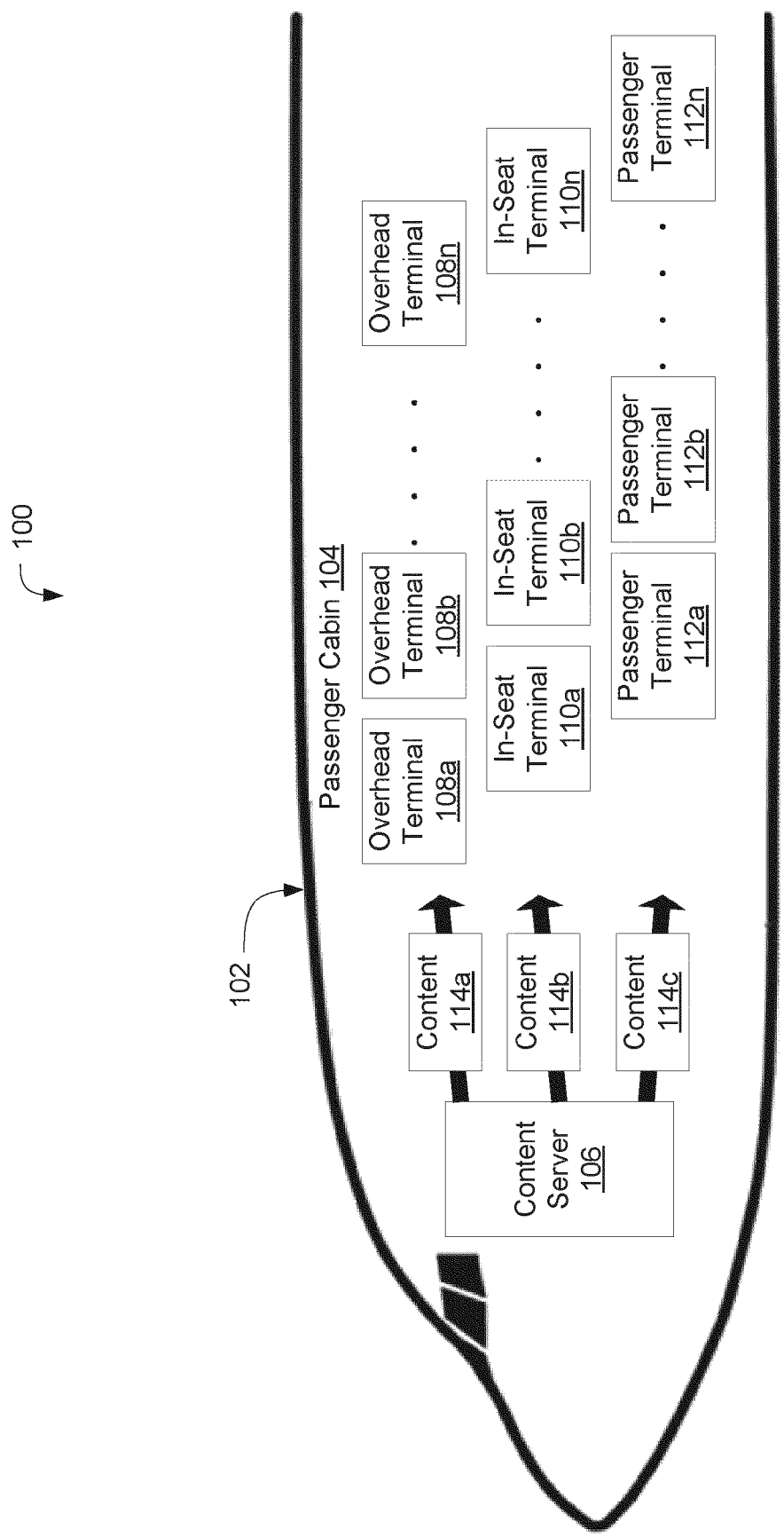
FIG. 1 is a block diagram depicting an embodiment of an environment for providing in-flight entertainment related content.

For purposes of reading the description of the various embodiments of the inventive concepts disclosed herein, the following descriptions of the sections of the specification and their respective contents can be helpful:

Section A describes embodiments of systems and methods for providing in-flight entertainment related content; and Section B describes a network environment and computing environment which can be useful for practicing embodiments described herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

A. Systems and Methods for Providing in-Flight Entertainment Related Content

In some aspects, embodiments of the inventive concepts disclosed herein are directed to systems and methods for providing in-flight entertainment related content. In an in-flight entertainment system, a single content server on an airplane may upload content (e.g., video, audio, or audio-visual) to various types of client terminals for local storage and subsequent playback. The various types of client terminals may include overhead client terminals, in-seat client terminals with audio and video units, and passenger terminals, among others. Upon receipt of the content, each client terminal may synchronize to a defined reference point for initiating playback of the content. Subsequent to the initiation of the playback, each client terminal may operate independently of one another. If any of the client terminal suffers from a disruption, the respective client terminal may resume the playback of the content at a point at which the disruption occurred, independent of all the other client terminals. The client terminal may also request streaming of the content (to initiate playback), from other client terminals or the content server. This allows for each client terminal to undergo minimal downtime and to resume almost immediate playback. With resumption of playback using the downloaded content or streaming in this manner, the in-flight entertainment system may thus maintain high availability across the client terminals. Additionally, by having a single content server deliver various content to a wide variety of client terminals, the amount of hardware onboard the airplane may be significantly reduced.

Referring now to FIG. 1, depicted is an embodiment of an environment 100 for providing in-flight entertainment related content, in accordance with some embodiments of the inventive concepts disclosed herein. In brief summary, the environment may include an airplane 102 with a passenger cabin 104. The airplane 102 may include a content server 106 and various client terminals, such as one or more overhead terminals 108a-108n, one or more in-seat terminals 110a-110n, and one or more passenger terminals 112a-112n, among others. In some embodiments, the one or more overhead terminals 108a-108n, the one or more in-seat terminals 110a-110n, and the one or more passenger terminals 112a-112n may be inside the passenger cabin 104. The content server 106, the one or more overhead terminals 108a-108n, the one or more in-seat terminals 110a-110n, and the one or more passenger terminals 112a-112n may be communicatively coupled to one another.

The content server 106 may be located or installed at specific locations of the airplane 102 for particular reasons. In some embodiments, the content server 106 may be located at a first location within an airplane 102, such as in an electronics/engineering (E/E) bay area, which allows for air cooling of the high speed media server. A content loading component can be a compact interface or module that resides in a second location of the airplane 102, such as a location in the cabin, bulkhead or bag bin region, for accessibility for example. The content server 106 can be located in an avionics rack in an aircraft avionics bay, for example.

The one or more overhead terminals 108a-108n, the one or more in-seat terminals 110a-110n, and the one or more passenger terminals 112a-112n may be located in the passenger cabin 104 of the airplane 102. The one or more overhead terminals 108a-108n may be generally located in or toward an upper portion of the passenger cabin 104 above one or more passenger seats. In some embodiments, the one or more overhead terminals 108a-108n may include a display unit (e.g., a cathode ray tube monitor, LED display, OLED) affixed to the roof of the passenger cabin 104 and may include an audio unit (e.g., a loudspeaker) located toward the roof of the passenger cabin 104. The one or more in-seat terminals 110a-n may be generally located within, by, or at each passenger seat of the passenger cabin 104. In some embodiments, the one or more in-seat terminals 110a-n may include a display unit (e.g., a cathode ray tube monitor, LED display, OLED) located on a backside of each passenger seat and may include an audio unit (e.g., a plug for earphones or headphones) located on the backside or an armrest of each passenger seat. The one or more passenger terminals 112a-112n may be located anywhere within the passenger cabin 104. In some embodiments, the one or more passenger terminals 112a-112n may include a personal mobile device (e.g., smartphone, tablets, laptops) brought onboard the airplane 102 by a user, and may be communicatively coupled to the content server 106 via a wireless access point (WAP). Details of the functionalities regarding the WAP is provided below.

The network connections among the content server 106, the one or more overhead terminals 108a-108n, the one or more in-seat terminals 110a-110n, and the one or more passenger terminals 112a-112n can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols. In some embodiments, the content server 106, the one or more overhead terminals 108a-108n, the one or more in-seat terminals 110a-110n, and the one or more passenger terminals 112a-112n may be communicatively coupled via a wireless network, a wired communications network, or a combination thereof.

The content server 106 may send or upload content 114a-114n to each of the overhead terminals 108a-108n, each of the in-seat terminals 110a-110n, and each of the passenger terminals 112a-112n via a communicative coupling. The content 114a-114n sent by the content server 106 may include audio content, visual content, and/or audiovisual content. The content 114a-114n sent by the content server 106 may vary dependent on whether the recipient client terminal is an overhead terminal 108a-108n, an in-seat terminals 110a-110n, or a passenger terminals 112a-112n. The content 114a-114n may include assets such as video files, audio files, graphic files, portions thereof, or combinations thereof, in some embodiments. Content, such as video content, audio content, menus, schedules, graphics and/or other electronic content may be delivered from the content server 106 to any of the overhead terminals 108a-108n, each of the in-seat terminals 110a-110n, and each of the passenger terminals 112a-112n for use or consumption (e.g., viewing and/or listening) by a user. The content server 106 can provide a variety of content including but not limited to web pages, entertainment guides, video-on-demand, audio-on-demand, near video-on-demand, and digital audio and video broadcasts to a passenger in an aircraft. The content server 106 can provide content on-demand, such as movies with or without digital rights management (DRM), television shows, music, and electronic books or magazines. The content server 106 can provide avionics information services such as moving map updates, via HTML or otherwise, with support on various user device operating systems (e.g., iOS, Android). The content server 106 can support e-commerce services such as catalog shopping, payment services (e.g., non-real time services, or real time services if connected), or pay per view. The content server 106 can support advertising or other augmented content (e.g., in connection with delivery of IFE content), which may include one or more of: static images (e.g., in GIF) or advertising videos within movies.

Once the content 114a-114n is received or downloaded, each of the one or more overhead terminals 108a-108n, the one or more in-seat terminals 110a-110n, and/or the one or more passenger terminals 112a-112n may operate independent from one another and from the content server 106, and may initiate playback from a defined reference point for the content. If any of the one or more overhead terminals 108a-108n, the one or more in-seat terminals 110a-110n, and/or the one or more passenger terminals 112a-112n undergoes disruption, the corresponding client terminal may identify a point at which the disruption occurred and start the playback of the downloaded content 114a-114n from the identified point. In addition, if any portion of the downloaded content 114a-114n becomes missing or corrupt, the client terminal may request streaming or download from another client terminal or the content server 106. Additional details regarding the functionality of the one or more overhead terminals 108a-108n, the one or more in-seat terminals 110a-110n, and the one or more passenger terminals 112a-112n are provided below in conjunction with FIG. 2.

Prior to making content available to a user or passenger on the aircraft, the content may be loaded to the content server 106 from a content source or storage/transfer device that is not permanently coupled to the content server 106. As an initial step for example, the content may be loaded or transferred to the content server 106 or a content loading component connected thereto. The content loading component may comprise a high speed loader and a control panel. The content loading component can include a communications processing board designed to speed up the loading of media content (e.g., 512 GB in minutes) from one or more content sources and/or storage devices to content server 106, using various interfaces, connectors, devices, and/or communications protocols for transfer. In some embodiments, the content loading component can support an Ethernet loader, SD cards, SSD and/or USB, for content loading. The content loading component may offer multiple data loading solutions, e.g., USB, Ethernet (e.g., via 1×1000BASE-T 1 Gigabit Ethernet ports), SD cards (e.g., SD, SDHC, SDXC), Wifi/3G/4G to perform media content upload and database update capability. The content loading component can provide high speed loading and/or background content loading, for example from any content source or storage device to the content loading component, and/or from the content loading component to content server 106. The content loading component can support parallel content loading via multiple interfaces and/or from multiple devices. For example, content stored on multiple SD cards can be loaded in parallel to content loading component. As another example, content may be loaded in parallel via an Ethernet interface and an USB interface.

The content server 106 may include a service module comprising a high-performance processor, random access memory and a temperature sensor for monitoring heat output and/or controlling cooling mechanism(s). The content server 106 may include one or more storage devices such as solid state drives, SSD1 and SSD2. In some embodiments, the content server 106 may include one or more of: an Intel i7 quad core processor, 8 GB DDR3 RAM, storage for 1.5 TB SSD (3×500 GB/512 GB), power over Ethernet (PoE) power injection, a multiport gigabit (GB) Ethernet switch, aircraft interfaces (e.g., ARINC 429 and discretes), and/or forced air cooling, among other components.

In some embodiments, the content server 106 may provide power to the control loading component. The content server 106 may include power over Ethernet (PoE) interfaces/connections to the one or more wireless access points (WAPs). The content server 106 may include an Ethernet controller with a Gigabit Ethernet managed L3 switch, for example with a total of ten external ports, and of these ports PoE enabled. In some embodiments, the content server 106 may use PoE with quad distribution. The content server 106 may support PoE corresponding to IEEE 802.3af for instance.

The content server 106 may include interfaces and/or modules for communications using Bluetooth (BT), gigabit Ethernet (GbE), USB and/or GPS channels. In some embodiments, the content server 106 may include a built-in GPS. By way of illustration, one embodiment of the content server 106 may include one or more of the following interfaces: Special Discrete Inputs (DSI) (e.g., Weight-on-Wheel, Engine-OFF, System Power-On, Cabin "WAP On/Off" command from CCP, Cabin Wifi On/Off command from cockpit); Special Discrete Outputs (DSO) (e.g., 1×

DSO WAP Wifi enable, 1× DSO 3G/4G enable/inhibition) (both signals can be connected to CCP); General Purpose DSI (e.g., 12× DSI OPN/GND) (e.g. 1× DSI Passenger Address-ON)+4× DSI 28V/OPN; General Purpose Discrete Outputs (DSO); LED CMD WAP-On; ARINC717 RX Bi Polar/Harvard Bi-Phase; ARINC717 TX Bi Polar/Harvard Bi-Phase (for factory testing only); ARINC429 RX channels; ARINC429 TX channel; RS422 RX/TX channels; Audio input +1× Audio output channels; Gb Power-over-Ethernet ports (IEEE 802.3af) to power up to 5 WAP; Gb Ethernet LAN channels (from FFP-2 to Right TIU, Left TIU, CCP, Spare 1 with Audio voice modulation, Spare 2 and Spare 3); 28V DC Power input channel; 12V DC output Power channels (2× power to L TIU & R TIU+1× power to CCP); RF channels (1× Iridium ISU 1/GPS signals & 1× Iridium ISU 2 signal); PCIe thru Optical Fiber link to CCP (Tx+Rx channels); CS 3G/4G or WiFi module Antenna output (as provision, if CCP is not connected); and HS 3G/4G or WiFi module Antenna output (as provision, if CCP is not connected). For instance, the 3G/4G and/or WiFi interfaces may be used (e.g., to connect with ground services, using a cellular or WiFi network for communicating data/content) to bypass use of the content loading component (CCP). In certain embodiments, the content server 106 may receive signals from the aircraft or public announcement (PA) system, e.g., to interrupt, pause or stop the provision of IFE related content to one of the client terminals.

The content server 106 can function as an on-board server for hosting applications software to provide the in-flight entertainment (IFE) functionality and flight related services to an airline customer, such as satellite communication service, control of wireless (e.g., WiFi) cabin performance, synchronization, aircraft data-bus connectivity for reception of flight-data, and/or hosting and execution of EFB and/or IFE applications. The content server 106 can provide system related functionalities such as network security, built-in-test, software and/or database update.

In some embodiments, the content server 106 can provide full aircraft coverage of IFE related services for all passengers. The content server 106 can include appropriate storage capacity for IFE related content and data, e.g., 1.5 TB of content storage space, which can be scaled, partitioned and/or expanded. The content server 106 can provide reliable AVOD streaming, for example at a minimum of 1 megabits per second (Mbps). The content server 106 can provide an information system for passengers and/or crew, that for instance include aircraft location or moving map info and updates. The content server 106 can provide support for operating systems of the one or more passenger terminals 112a-112n (e.g., Android, iOS, Windows and MAC OS). The IFE system and/or content server 106 can be integrated with Aircraft Avionics (e.g., using ARINC 429, Keylines), to provide or enable automated enable/disable of radio frequency service, and pausing of content during public announcements (PA) transmissions. In some embodiments, the content server 106 may support 2.4 and/or 5 GHz wireless operation, and 802.11n (a/b/g/n) wireless local network service. The content server 106 can support or provide an open platform to allow integration of applications and/or features by third parties.

A WiFi option or capability of the content loading component can allow connection to an airport network as a WiFi client or can be used as a low cost wireless access point for the one or more passenger terminals 112a-112n. The content loading component can be installed in the video control center (VCC), for example on an A330 aircraft, or an IFE control panel or overhead bin, for example on an A320/A321 aircraft, or other locations of an aircraft. The content loading component of the content server 106 may be installed in an overhead bin area of an aircraft. In some embodiments, the content loading component allows cabin crew to control the cabin's wireless network for the activation/de-activation of WiFi connectivity. The content loading component can provide an interface to initiate maintenance built-in-test (MBIT) and/or display built-in-test status. By way of illustration, one embodiment of the content loading component may include one or more of the following interfaces: 1× P/B System ON/OFF (provision only); 1× P/B Cabin Wifi ON/OFF; 1× P/B MBIT request; 1× LAN GbE for external ETH/Ethernet (RJ45); 2× USB3.0 ports & 2× USB port LEDs; 6× SD card slots & 6× SD card slots LEDs; 1× BIT in-progress LED; 1× System health status LED; 1× IFE application health status LED; 1× WAP-On LED; 1× SIM card slot; and 1× CCP Power ON/OFF status LED.

A number of wireless access points (WAPs) can be installed on structure of the airplane 102, for example above the cabin ceiling panel, to distribute content to the one or more overhead terminals 108a-108n, one or more in-seat terminals 110a-110n, and the one or more passenger terminals 112a-112n via a wireless Local Area Network (WLAN), and to provide full WiFi coverage throughout cabin area. WiFi-connectivity can allow passengers to access media content for inflight streaming (e.g., movies, music, shopping information) from their laptop, tablet and other mobile devices, for instance. The WAPs can each include a 1×1000BASE-T Gigabit Ethernet port with Power-over-Ethernet (PoE) support. One or more of WAPs can be powered and controlled by the content server main board via Gigabit PoE. The WAPs may support IEEE 802.11 a/b/g/n, IEEE 802.11i (e.g., AES, WEP, WPA, WPA2), IEEE 802.11e, and/or WiFi multimedia (WMM). The WAPs are MIMO capable to handle the harsh multi-path environment in an aircraft. Each WAP may include a dual-radio, dual band, and three-stream 802.11n wireless access point designed for data, voice, and video applications in aircraft deployments. The WAPs are capable of delivering wireless bandwidth to support every client terminal on the airplane 102.

Antennas of the WAPs radiate radio or WiFi signals in the aircraft cabin area, which can enable passengers to have WiFi connectivity for streaming of content using their laptop, smart phones and tablet, for example. Such antennas may be installed in the cabin ceiling panel attached to mounting brackets and the aircraft frame for example. The WAP Antenna may radiate radio signals of 3.5 dBi Gain at 2.4 Ghz and 4.0 dBi at 5.0 Ghz, for example. The WiFi signals emitted in the aircraft cabin area can enable passengers to have WiFi connectivity for streaming of movies, video and shopping using their laptop, smart phones and tablet for instance. In some embodiments, a WAP antenna is installed in the cabin ceiling panel attached to mounting bracket and aircraft frame.

In some embodiments, the content server 106 may be configured to allow automatic cabin WiFi activation. For instance, the cabin WiFi network may be switched on when the aircraft is airborne with altitude greater than a pre-defined threshold altitude (e.g. 10,000 ft above Mean Sea Level—MSL), and a WAP switch/setting is set to "ON", or when all engines of the aircraft are powered-off and the aircraft is on-ground and a WAP "ON/OFF" push button is switched-on. The cabin WiFi network may be switched off when the aircraft is airborne with altitude less than a pre-defined threshold altitude (e.g. 10,000 ft above MSL)

and the WAP "ON/OFF" switch/setting is set to "off", or when at least one engine is powered-on and the aircraft is on the ground.

In some embodiments, the content server 106 may be integrated with off aircraft connectivity, such as air-to-ground, satellite communications (Satcom), Gatelink and/or cellular connectivity. Such connectivity can for example, enable the content server 106 provide one or more of: connected applications, passenger Internet, real time payment processing, content loading, system maintenance, or ground services. The content server 106 may be operably coupled with a single or dual Iridium antenna on top of the aircraft fuselage for satellite communication via Iridium satellite network and/or other networks. A dual Iridium antenna 1× RF channel for Iridium ISU1/GPS signals+1× RF channel for Iridium ISU2 signal.

Figure 2:
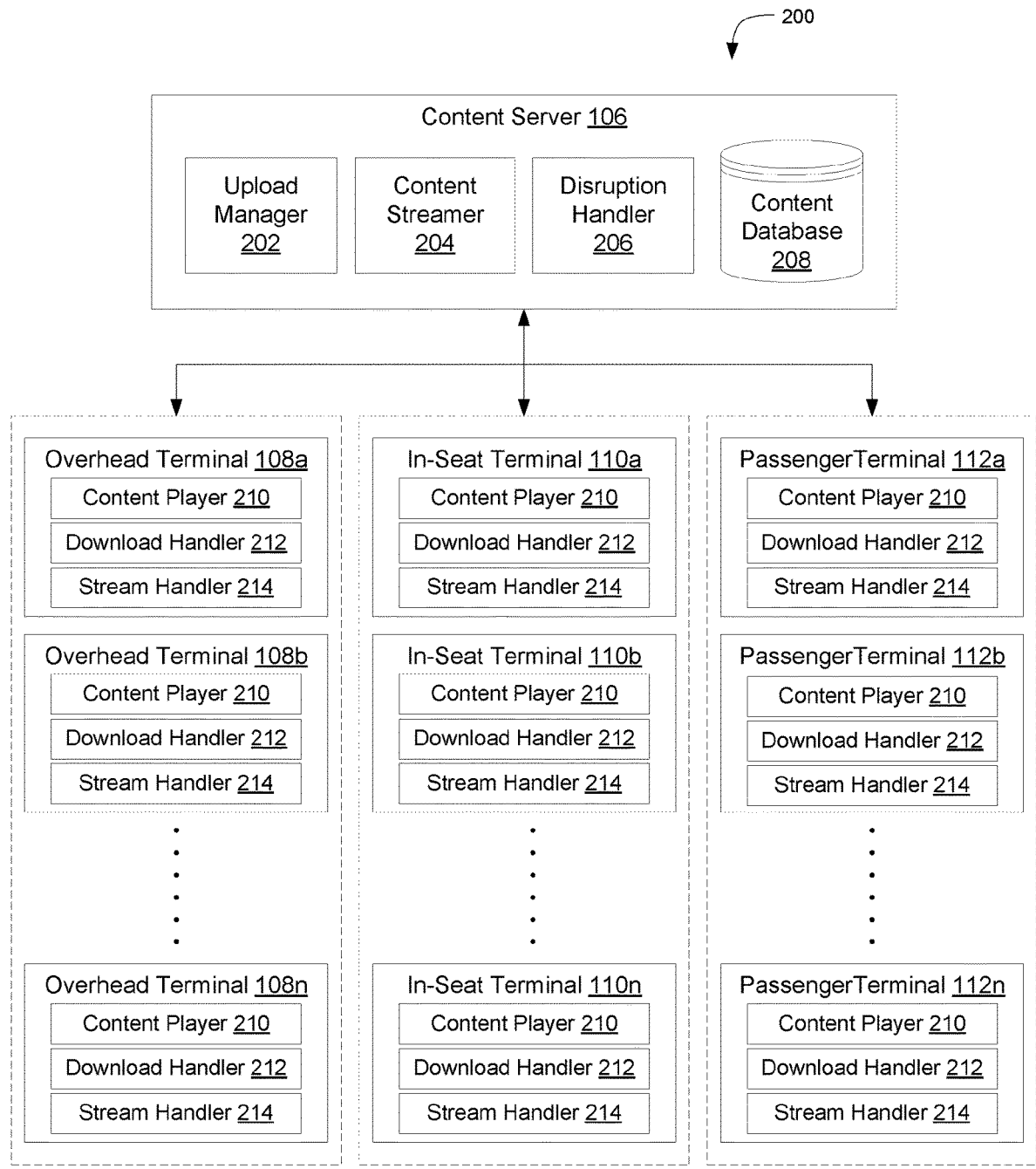
FIG. 2 is a block diagram depicting one embodiment of a system providing in-flight entertainment related content.

Referring now to FIG. 2, shown is an embodiment of a system 200 for providing in-flight entertainment related content, in accordance with some embodiments of the inventive concepts disclosed herein. In brief overview, the content server 106 may include an upload manager 202, a content streamer 204, a disruption handler 206, and a content database 208, among others. Each of the one or more overhead terminals 108a-108n, the one or more in-seat terminals 110a-110n, and the one or more passenger terminals 112a-112n may include a content player 210, a download handler 212, and a stream handler 214. Each of the above-mentioned elements or entities is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 4A and 4B, in some embodiments.

In further detail, at the content server 106, the upload manager 202 may upload the content 114a-114n to each of the client terminals, such as the one or more overhead terminals 108a-108n, the one or more in-seat terminals 110a-110n, and/or the one or more passenger terminals 112a-112n for local storage and subsequent playback at the respective client terminal. The content 114a-114n and/or the content server 106 may specify a defined reference point for initiating playback of the content at the respective client terminal. The defined reference point may indicate to the client terminal a point in time within the content 114a-114n at which to initiate playback. The defined reference point may differ based on which client terminal the content 114a-114n is uploaded onto. In some embodiments, the defined reference point may differ based on which type of content 114a-114n (e.g., audio, visual, or audiovisual) is uploaded onto the client terminal.

The content 114a-114n uploaded by the upload manager 202 may be from the content database 208. The content database 208 may include audio content, video content, or audiovisual content originally from a content source or storage/transfer device outside the content server 106. The content database 208 may operate as a central repository for storing and providing content to the client terminals. The content database 208 may include one or more storage devices that includes or maintains a database. The content database 208 may include or store unique asset identifications for each asset to be distributed within an aircraft network to the one or more overhead terminals 108a-108n, the one or more in-seat terminals 110a-110n, and/or the one or more passenger terminals 112a-112n. The upload manager 202 may access the content database 208 to identify content 114a-114n to upload onto the client terminals.

In some embodiments, the content 114a-114n sent or uploaded by the upload manager 202 may differ depending on a device type of the client terminal. The upload manager 202 may identify whether the recipient client terminal is one of the overhead terminals 108a-108n, the in-seat terminals 110a-110n, or the passenger terminals 112a-112n. Based on the identification of the client terminal, the upload manager 202 may send, distribute, or upload first content 114a to the overhead terminals 108a-108n, second content to the in-seat terminals 110a-110n, and third content to the passenger terminal 112a-n, for instance. In some embodiments, the upload manager 202 may determine audio/visual capability (e.g., processing, playback, display resolution, format support and/or storage capability) of the client terminal. Based on the determination, the upload manager 202 may send or upload audio content, visual content, or audiovisual content to the corresponding client terminal. If the corresponding client terminal is determined to have only audio capabilities (e.g., an in-seat terminal 110a-110n with only an audio plug), the upload manager 202 may upload audio content to the client terminal. If the corresponding client terminal is determined to have only video capabilities (e.g., an overhead terminal 108a-110n with only a display unit), the upload manager 202 may upload video content to the client terminal. If the corresponding client terminal is determined to have both audio and video capabilities (e.g., an overhead terminal 108a-108n with a display unit and a loudspeaker, an in-seat terminal 110a-110n with an audio plug and a display unit, or a passenger terminal 112a-112n), the upload manager 202 may upload audiovisual content to the client terminal.

In some embodiments, the upload manager 202 may upload the content 114a-114n in accordance with an order of upload. The order of upload may specify a sequence in which the upload manager 202 is to upload the content 114a-114n to each of the overhead terminals 108a-108n, the in-seat terminals 110a-110n, and/or the passenger terminals 112a-112n. The upload manager 202 may identify or generate the order of upload to the client terminals based on any number of factors or any combination thereof. In some embodiments, the order of upload may be based on a relative proximity of each of the client terminals to the content server 106 for instance. The upload manager 202 may identify the relative proximity of each of the overhead terminals 108a-108n and the in-seat terminals 110a-110n from a preset arrangement or predetermined distance from the content server 106 within the passenger cabin 104 of the airplane 102. In some embodiments, the upload manager 202 may identify a location of the passenger terminals 112a-112n within the passenger cabin 104 of the airplane 102 based on which wireless access point and/or which physical in-seat port the passenger terminal 112a-112n is connected to. In some embodiments, the upload manager 202 may set client terminals that are closer toward the content server 106 as earlier in the order of upload and client terminals that are further away from the content server 106 as later in the order of upload. In some embodiments, the order of upload may be based on relative percentages of completion in downloading the content 114a-114n onto the client terminals. The upload manager 202 may identify a percentage of completion in downloading the content 114a-114n for each client terminal. The upload manager 202 may set client terminals with lower percentages of completion as earlier (or later) in the order of upload and client terminals with higher percentages of completion as later (or earlier) in the order of upload.

Once the content 114a-114n is received, the content player 210 of each overhead terminal 108a-108n, each in-seat terminal 110a-110n, and each passenger terminal 112a-112n may synchronize to the defined reference point for initiating playback. With each client terminal synchronized to the defined reference point, the content player 210 at each of the overhead terminals 108a-108n, each of the in-seat terminals 110a-110n, and each of the passenger terminals 112a-112n may initiate playback of the content 114a-114n. In some embodiments, the playback of the content 114a-114n may be initiated at the corresponding client terminal upon a request to playback the content. In some embodiments, the request to playback may be via a user input (e.g., command to play the content 114a-114n via a button press or touchscreen input).

In some embodiments, the content player 210 (e.g., a media player) may include audio playing capability, video playing capability, or audiovisual playing capability. A content player 210 with audio playing capability may play audio content received from the content server 106. A content player 210 with video playing capability may play video content received from the content server 106. A content player 210 with audiovisual playing capability may play audiovisual content received from the content server 106. In some embodiments, the content player 210 at overhead terminals 108a-108n may include video playing capability or audiovisual playing capability. In some embodiments, the content player 210 at in-seat terminals 110a-110n may include audio playing capability or audiovisual playing capability. In some embodiments, the content player 210 at passenger terminals 112a-112n may include audiovisual play capability.

Subsequent to initiating the playback of the downloaded content 114a-114n, each of the overhead terminals 108a-108n, each of the in-seat terminals 110a-110n, and/or each of the passenger terminals 112a-112n may operate independently of one another and the content server 106. In some embodiments, once the content 114a-114n is fully downloaded, the client terminal may operate without depending on another client terminal or the content server 106 for the playback of the content 114a-114n. In this manner, any impact from technical issues or disruptions arising at the content server 106 or another client terminal may be limited to the content server 106 or the corresponding client terminal. Additionally, any impact from technical problems or system disruptions originating at the client terminal may be restricted to just the client terminal. The system disruption (e.g., power outage, memory leak, run failure, disk failure, software failure) may result in the client terminal rebooting or re-initializing. In some cases, the system disruption may result in the wiping or corruption of at least some portion of the content 114a-114n stored at the client terminal. The wiping or corruption of the content 114a-114n may be during playback or subsequent to or before initiation of playback of the content 114a-114n.

Subsequent to the system disruption at the client terminal during playback of the content 114a-114n, the content player 210 may resume the playback of the content 114a-114n at a point at which the system disruption occurred. The point at which the system disruption occurred may correspond to a point in time during the playback of the content 114a-114n at the client terminal at which the system disruption occurred. The content player 210 may identify the content 114a-114n, the playback of which was interrupted by the system disruption. In some embodiments, the content player 210 may maintain or keep track of which content 114a-114n was played at the client terminal (e.g., using non-volatile memory). Once the content 114a-114n is identified, the content player 210 may identify the point at which the system disruption occurred.

The content player 210 may determine whether at least a portion of the content 114a-114n stored at the client terminal is missing or corrupted. If none of the content 114a-114n is missing or corrupted, the content player 210 may resume the playback of the stored content 114a-114n from the point at which the system disruption occurred. The resumption of the playback of the content 114a-114n may be independent of the playback in other client terminals. That is, the content player 210 may resume the playback of the content 114a-114n from its local storage, without sending requests or indicators to the other client terminals or the content server 106 for access to the content 114a-114n.

On the other hand, if at least some portion of the content 114a-114n is missing or corrupted, the content player 210 may request the content 114a-114n from the content server 106. In some embodiments, the stream handler 214 may request streaming of the corresponding content 114a-114n from the content server 106 to initiate the playback of the content 114a-114n from the point at which the system disruption occurred. In some embodiments, the stream handler 214 may send a request for streaming to the content server 106. The request may identify the content 114a-114n requested by the client terminal (e.g., with an identifier). The request for streaming may also indicate the point at which the system disruption occurred (e.g., with a time stamp). Subsequently, the content streamer 204 at the content server 106 may stream the request content 114a-114n to the client terminal that made the request, starting from the point at which the system disruption occurred. In some embodiments, the content streamer 204 may identify the content 114a-114n requested by the client terminal and may access the content database 208 to identify the content 114a-114n to provide to the client terminal. The stream handler 214 may in turn receive data packets corresponding to the content 114a-114n from the content server 106, and temporarily store the received data (e.g., packets or bits) in a buffer for immediate playback. As the stream handler 214 continues to receive and store the received data in the buffer, the content player 210 may process the data and play the streaming content 114a-114n. The streaming of the content 114a-114n may be via wireless and/or wired streaming. For instance, a passenger client terminal may stream content via WiFi, and an overhead client terminal may stream content via a wired connection to the content server. The streaming of the content 114a-114n may be in accordance with any number of protocols, such as MP3, MP4, FLV, ASF, H.265, VP8, VP9, or HEVC, among others.

Concurrent to the streaming of the content 114a-114n, the upload manager 202 may upload at least some portion of the same content 114a-114n onto the client terminal that made the request, for local storage via data transfer separate from the streaming. In turn, the download handler 212 may download and store at least the portion of the same content 114a-114n for local storage at the client terminal corresponding from the point at which the disruption occurred. The downloaded content 114a-114n may be stored at the client terminal for an extended period of time for playback at a later time using the stored content 114a-114n, in contrast to streamed content 114a-114 that may be temporarily stored in a buffer at the client terminal for immediate, live playback.

In some embodiments, the stream handler 214 may request the content 114a-114n from another client terminal and/or located proximate to the client terminal, responsive to determining that at least some portion of the content 114a-114n is missing or corrupted. The stream handler 214 may identify one of the other client terminals of the same device type. In some embodiments, if the client terminal is an overhead terminal 108a-108n, the stream handler 214 may identify another overhead terminal 108a-108n to which to request streaming of the content 114a-114n. In some embodiments, if the client terminal is an in-seat terminal 110a-110n, the stream handler 214 may identify another in-seat terminal 110a-110n to which to request streaming of the content 114a-114n. In some embodiments, if the client terminal is an passenger terminal 112a-112n, the stream handler 214 may identify another passenger terminal 112a-112n to which to request streaming of the content 114a-114n. In some embodiments, the stream handler 214 may identify another client terminal of a different device type. In some embodiments, if the client terminal is an overhead terminal 108a-108n, the stream handler 214 may identify another in-seat terminal 110a-110n or a passenger terminal 112a-112n to which to request streaming of the content 114a-114n. In some embodiments, if the client terminal is an in-seat terminal 110a-110n, the stream handler 214 may identify an overhead terminal 108a-108n or a passenger terminal 112a-112n to which to request streaming of the content 114a-114n. In some embodiments, if the client terminal is an passenger terminal 112a-112n, the stream handler 214 may identify an overhead terminal 108a-108n or an in-seat terminal 110a-110n to which to request streaming of the content 114a-114n. The stream handler 214 may determine which of the other client terminals of the same device type or a different device type is located proximate to the client terminal. In some embodiments, the stream handler 214 may identify another client terminal type that is closest to the client terminal. With the identification of the other client terminal of the same device type or the different device type, the stream handler 214 may send a request to stream the content 114a-114n from the point at which the disruption occurred from the point at which the system disruption occurred.

The disruption handler 206 at the content server 106 may detect system disruptions across the overhead terminals 108a-108n, the in-seat terminals 110a-110n, and/or the passenger terminals 112a-112n. In some embodiments, the disruption handler 206 may detect the system disruption occurring at one of the overhead terminals 108a-108n, the in-seat terminals 110a-110n, and/or the passenger terminals 112a-112n based on a functionality indicator sent periodically by each of the client terminal for instance. If a functionality indicator is received from one of the client terminals within a predefined time interval, the disruption handler 206 may determine that the client terminal is functioning normally. If a functionality indicator is not received from one of the client terminals within a predefined time interval, the disruption handler 206 may determine that the a system disruption has occurred at the corresponding client terminal. Without any request or other input from the client terminal, the disruption handler 206 may determine which content 114a-114n stored or played at the client terminal is affected. In some embodiments, the disruption handler 206 may detect the system disruption via a disruption indicator issued at a disrupted client terminal. The disruption indicator may be generated by the client terminal, subsequent to the re-initialization after the system disruption due to abnormal operation, a reboot, difficulty in playing back a portion of the content that is corrupted, etc. The disruption indicator may indicate which type of system disruption the client terminal experienced, such as power outage, resource leak, run failure, disk failure, and/or software failure, among others. Using the disruption indicator, the disruption handler 206 may determine which content 114a-114n stored or played at the client terminal is affected. For example, certain types of system disruptions may be associated with wiping or corrupting of the content 114a-114n stored at the disrupted client terminal. In some embodiments, the disruption handler 206 may identify the type of system disruption the client terminal experienced from the disruption indicator. Based on the identification, the disruption handler 206 may determine whether the content 114a-114n was affected due to the system disruption.

In some embodiments, if the content 114a-114n is affected, the upload manager 202 or the content streamer 204 of the content server 106 may provide the content 114a-114n to the affected client terminal. In some embodiments, the disruption handler 206 may determine whether the content 114a-114n stored on the client terminal was affected from the system disruption in specifying the command. In some embodiments, the disruption handler 206 may identify a status of the content 114a-114n stored on the client terminal in specifying the command. The status may indicate whether the content 114a-114n is intact or whether at least a portion of the content 114a-114n is missing or corrupted subsequent to the occurrence of the system disruption. The status may also indicate whether the content 114a-114n was being played back or stream immediately prior to the system disruption at the client terminal. If the portion of the content 114a-114n downloaded onto the client terminal is intact after the occurrence of the system disruption, the upload manager 202 may resume uploading the rest of the content 114a-114n onto the client terminal for local storage via data transfer, separate from any streaming. If at least a portion of the content 114a-114n being played back is determined to be missing or corrupted at the client terminal, the upload manager 202 may initiate upload of the content 114a-114n anew, or initiate a replacement of the missing or corrupted portion via upload. If the content 114a-114n is determined to have been played back at the client terminal when the system disruption occurred and at least a portion of the content 114a-114n is missing or corrupted, or the content 114a-114n was being streamed, the disruption handler 206 may identify the point at which the system disruption occurred and the content streamer 204 may stream the content 114a-114n from the identified pointed.

In some embodiments, if the content 114a-114n is affected, the disruption handler 206 may command, request or instruct one of the other client terminals to provide the content 114a-114n to the client terminal with the affected content. The disruption handler 206 may identify a device type of the affected client terminal (e.g., an overhead terminal 108a-108n, an in-seat terminal 110a-110n, or a passenger terminal 112a-112n). With the identification of the device type of the affected client terminal, the disruption handler 206 may identify one other client terminal. In some embodiments, the disruption handler 206 transmit a command to the client terminal affected by the system disruption. The command may specify that the affected client terminal is to transmit a request to the identified client terminal to download or stream the content 114a-114n. In some embodiments, the disruption handler 206 may determine whether the content 114a-114n stored on the client terminal was affected from the system disruption in specifying the command. In some embodiments, the disruption handler 206 may identify a status of the content 114a-114n stored on the client terminal in specifying the command. The status may indicate whether the content 114a-114n is intact or whether at least a portion of the content 114a-114n is missing or corrupted subsequent to the occurrence of the system disruption. The status may also indicate whether the content 114a-114n was being played back or stream immediately prior to the system disruption at the client terminal. If the portion of the content 114a-114n downloaded onto the client terminal is intact after the occurrence of the system disruption, the command may specify the affected client terminal to request (and resume) downloading of the content 114a-114n from the identified client terminal via data transfer separate/different from streaming. If at least a portion of the content 114a-114n (e.g., stored locally) being played back is determined to be missing or corrupted at the client terminal, the command may specify the affected client terminal to request downloading of the content 114a-114n from the identified client terminal anew, or initiate a replacement of the missing or corrupted portion via upload. If the content 114a-114n is determined to be playing back at the client terminal when the system disruption occurred and at least a portion of the content 114a-114n is missing or corrupted or the content 114a-114n was being streamed, the command may specify the affected client terminal to request streaming of the content 114a-114n from the identified client terminal from the point at which the system disruption occurred.

In some embodiments, the disruption handler 206 transmits a command to the identified client terminal to provide the content 114a-114n to the affected client terminal. The command may specify that the identified client terminal is to upload or stream the content 114a-114n to the affected client terminal. In some embodiments, the disruption handler 206 may determine whether the content 114a-114n stored on the client terminal was affected from the system disruption in specifying the command. In some embodiments, the disruption handler 206 may identify a status of the content 114a-114n stored on the client terminal in specifying the command. The status may indicate whether the content 114a-114n is intact or whether at least a portion of the content 114a-114n is missing or corrupted subsequent to the occurrence of the system disruption. The status may also indicate whether the content 114a-114n was being played back or stream immediately prior to the system disruption at the client terminal. If the content 114a-114n downloaded onto the client terminal is intact after the occurrence of the system disruption, the command may specify the identified client terminal is to upload the content 114a-114n onto the affected client terminal via data transfer separate/different from streaming. If at least a portion of the content 114a-114n being played back is determined to be missing or corrupted at the client terminal, the command may specify the identified client terminal is to upload the content 114a-114n onto the affected client terminal anew, or initiate a replacement of the missing or corrupted portion via upload. If the content 114a-114n is determined to be playing back at the client terminal when the system disruption occurred and at least a portion of the content 114a-114n is missing or corrupted or the content 114a-114n was being streamed, the command may specify the affected client terminal to request streaming of the content 114a-114n from the identified client terminal from the point at which the system disruption occurred.

Prior to completion of downloading of the content 114a-114n from the upload manager 202 of the content server 106, the download handler 212 may receive a request to playback content 114a-114n that is not yet completely downloaded or that is otherwise unavailable at the client terminal. In some embodiments, the request to playback may be via a user input. In some embodiments, responsive to the request to playback the content 114a-114n, the download handler 212 may determine whether the upload of the corresponding content 114a-114n to the client terminal for local storage is complete. In some embodiments, the download handler 212 may identify a percentage of completion of download for the corresponding content 114a-114n. If the download of the corresponding content 114a-114n is complete (e.g., at a 100%), the content player 210 of the client terminal may initiate playback, e.g., from the defined reference point. If the download of the corresponding content 114a-114n is near complete (e.g., at 98%), the content player 210 of the client terminal may delay playback for an acceptable or suitable time period until the download is complete.

On the other hand, if the download of the corresponding content 114a-114n is not complete (e.g., below 100%, or below a predefined level, or at least partially corrupted), the stream handler 214 may request streaming of the corresponding content 114a-114n from the content server 106 to initiate the playback of the content 114a-114n. In some embodiments, the stream handler 214 may send a request for streaming to the content server 106. The request may identify the content 114a-114n requested by the client terminal. Subsequently, the content streamer 204 at the content server 106 may stream the requested content 114a-114n to the client terminal that made the request. In some embodiments, the content streamer 204 may identify the content 114a-114n requested by the client terminal and may access the content database 208 to identify the content 114a-114n to provide to the client terminal. Concurrent to the streaming of the content 114a-114n, the upload manager 202 may upload at least some portion of the same content 114a-114n onto the client terminal that made the request for local storage via data transfer separate from the streaming. In turn, the download handler 212 may download at least the portion of the same content 114a-114n for local storage at the client terminal.

In some embodiments, the stream handler 214 may send a request for streaming to another client terminal of the same type to initiate the playback of the content 114a-114n. In some embodiments, the stream handler 214 may request the content 114a-114n from another client terminal of the same device type or a different device type. The stream handler 214 may identify one of the other client terminals of the same device type. In some embodiments, if the client terminal is an overhead terminal 108a-108n, the stream handler 214 may identify another overhead terminal 108a-108n to which to request streaming of the content 114a-114n. In some embodiments, if the client terminal is an in-seat terminal 110a-110n, the stream handler 214 may identify another in-seat terminal 110a-110n to which to request streaming of the content 114a-114n. In some embodiments, if the client terminal is an passenger terminal 112a-112n, the stream handler 214 may identify another passenger terminal 112a-112n to which to request streaming of the content 114a-114n. In some embodiments, the stream handler 214 may identify another client terminal of a different device type. In some embodiments, if the client terminal is an overhead terminal 108a-108n, the stream handler 214 may identify another in-seat terminal 110a-110n or a passenger terminal 112a-112n to which to request streaming of the content 114a-114n. In some embodiments, if the client terminal is an in-seat terminal 110a-110n, the stream handler 214 may identify an overhead terminal 108a-108n or a passenger terminal 112a-112n to which to request streaming of the content 114a-114n. In some embodiments, if the client terminal is an passenger terminal 112a-112n, the stream handler 214 may identify an overhead terminal 108a-108n or an in-seat terminal 110a-110n to which to request streaming of the content 114a-114n. The stream handler 214 may determine which of the other client terminals is located proximate to the client terminal. In some embodiments, the stream handler 214 may identify another client terminal type that is closest to the client terminal. With the identification of the other client terminal of, the stream handler 214 may send a request to stream the content 114a-114n to initiate streaming at the client terminal.

During downloading of the content 114a-114n from the content server 106, the download handler 212 may detect an occurrence of the system disruption to downloading of the content 114a-114n at the client terminal. The content 114a-114n may not have been requested to be played back at the client terminal. In some embodiments, once the client terminal is re-initialized, the content player 210 may maintain a timer to determine whether there is a gap or discontinuity in time between previous time the content 114a-114n was downloaded, and the current time. If there is a gap, the download handler 212 may request the upload manager 202 to resume downloading of the content 114a-114n from the point at which the prior download was interrupted by the system disruption. In some embodiments, the download handler 212 may identify another client terminal of the same device type or different device type to download the content 114a-114n, in a similar manner as the stream handler 214 detailed above. In some embodiments, the download handler 212 may identify another client terminal closest to the client terminal. The download handler 212 may then download the content 114a-114n from the identified client terminal.

Figure 3:
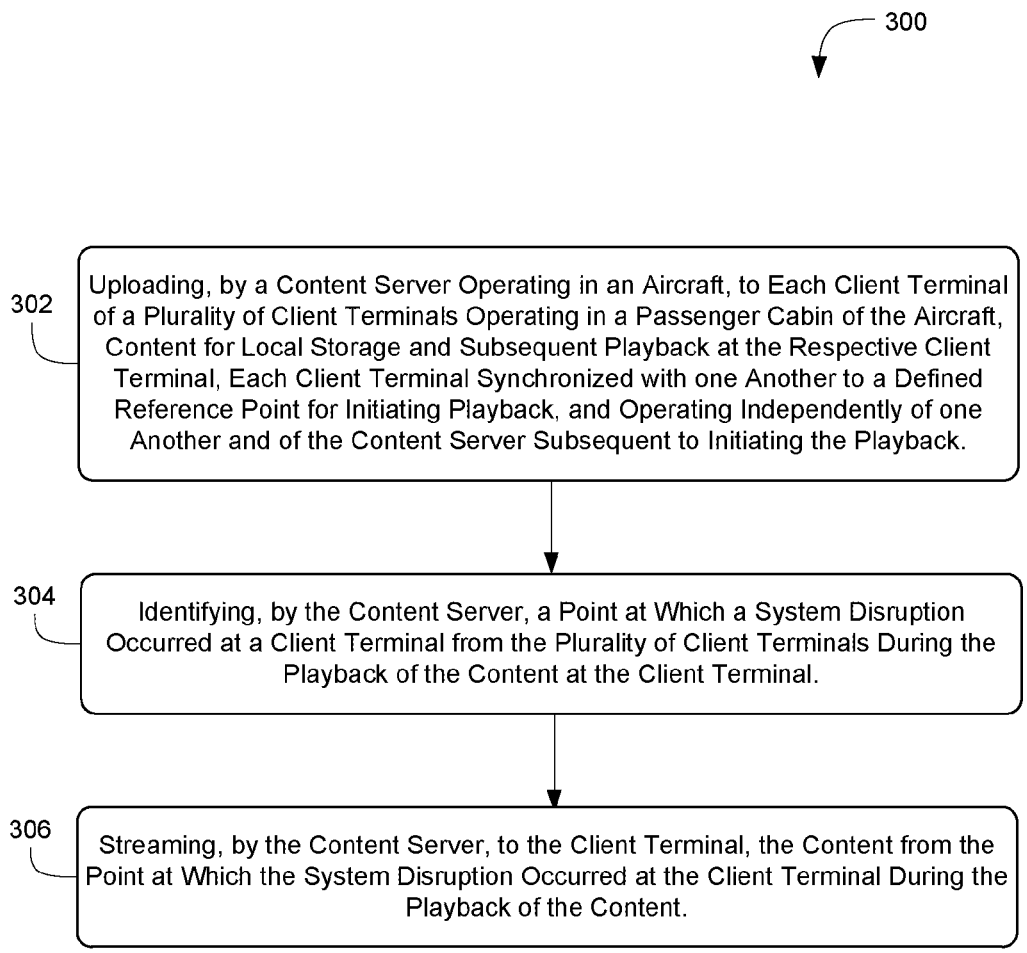
FIG. 3 is a flow diagram depicting one embodiment of a method of providing in-flight entertainment related content.

Referring now to FIG. 3, depicted is a method 300 for providing in-flight entertainment related content, in accordance with some embodiments of the inventive concepts disclosed herein. The functionalities of method 300 may be implemented by any of the computing devices and system architectures depicted in FIGS. 1 and 2. In brief overview, a content server operating in an aircraft may upload, to each client terminal of a plurality of client terminals operating in a passenger cabin of the aircraft, content for local storage and subsequent playback at the respective client terminal (302). Each client terminal may synchronize with one another to a defined reference point for initiating playback. Each client terminal may operate independently of one another and of the content server subsequent to initiating the playback. The content server may identify a point at which a system disruption occurred at a client terminal from the plurality of client terminals during the playback of the content at the client terminal (304). The content server may stream, to the client terminal, the content from the point at which the system disruption occurred at the client terminal during the playback of the content (306).

In further detail, referring now to step 302, and in some embodiments, a content server operating in an aircraft may upload, to each client terminal of a plurality of client terminals operating in a passenger cabin of the aircraft, content for local storage and subsequent playback at the respective client terminal. The plurality of client terminals may include one or more overhead terminals, one or more in-seat terminals, and/or one or more passenger terminals. Each client terminal may synchronize with one another to a defined reference point for initiating playback. Each client terminal may operate independently of one another and of the content server subsequent to initiating the playback.

Once the content is fully downloaded, each client terminal may operate without depending on another client terminal or the content server for the playback of the content. The content may include audio content, video content, or audio-visual content distributed by the content server to each client terminal based on audio/visual capability of the client terminal. In some embodiments, the content server may upload the content in accordance with an order of upload. The order of upload may specify a sequence in which the content server is to upload the content to each of the overhead terminals, the in-seat terminals, and/or the passenger terminals. The content server may identify or generate the order of upload to the client terminals based on any number of factors or any combination thereof, such as a relative proximity to the content server or relative percentages of completion in downloading content.

Referring now to step 304, and in some embodiments, the content server may identify a point at which a system disruption occurred at a client terminal from the plurality of client terminals during the playback of the content at the client terminal. In some embodiments, the content server may detect the system disruption occurring at one of the client terminals based on a disruption indicator generated responsive to the system disruption, or a functionality indicator sent periodically by each of the client terminal. If a functionality indicator is received from one of the client terminals within a predefined time interval, the content server may determine that the client terminal is functioning normally. If a functionality indicator is not received from one of the client terminals within a predefined time interval, the content server may determine that the a system disruption has occurred at the corresponding client terminal. In some embodiments, the content server may detect the system disruption via a disruption indicator issued at a disrupted client terminal. The disruption indicator may be generated by the client terminal, subsequent to the re-initialization after the system disruption due to abnormal operation, a reboot, and difficulty in playing back a portion of the content that is corrupted, among others.

Referring now to step 306, and in some embodiments, the content server may stream, to the client terminal, the content from the point at which the system disruption occurred at the client terminal during the playback of the content. The content server may identify the point at which the system disruption occurred. Based on the system disruption, the content server may provide the content to the affected client terminal. The content server may then provide the content to the affected client terminal directly via data transfer or via streaming the content to the client terminal. The content server may also command another client terminal to provide the content to the affected client terminal via data transfer or via streaming.

Using the disruption indicator generated by the client terminal, the content server may determine which content stored or played at the client terminal is affected. In some embodiments, if the content is affected, the content server may provide the content to the affected client terminal. In some embodiments, the content server may identify the type of system disruption the client terminal experienced from the disruption indicator. In some embodiments, the content server may transmit a command to the client terminal to download or stream the content from another client terminal based on the type of system disruption indicated by the disruption indicator. In some embodiments, the content server may transmit a command to another client terminal to upload or stream the content to the affected client terminal based on the type of system disruption indicated by the disruption indicator.

In some embodiments, subsequent to the system disruption at the client terminal during the playback of the content, the client terminal may resume the playback of the content at a point at which the system disruption occurred. The point at which the system disruption occurred may correspond to a point in time during the playback of the content at the client terminal at which the system disruption occurred. In some embodiments, the client terminal may maintain or keep track of which content was played at the client terminal. Once the content is identified, the client terminal may identify the point at which the system disruption occurred and may initiate playback from the identified point. In some embodiments, the client terminal may determine whether at least a portion of the content stored at the client terminal is missing or corrupted. If at least some portion of the content is missing or corrupted, the client terminal may request the content from the content server or another client terminal by sending a request to stream or download the affected content.

B. Computing and Network Environment

Figure 4A:
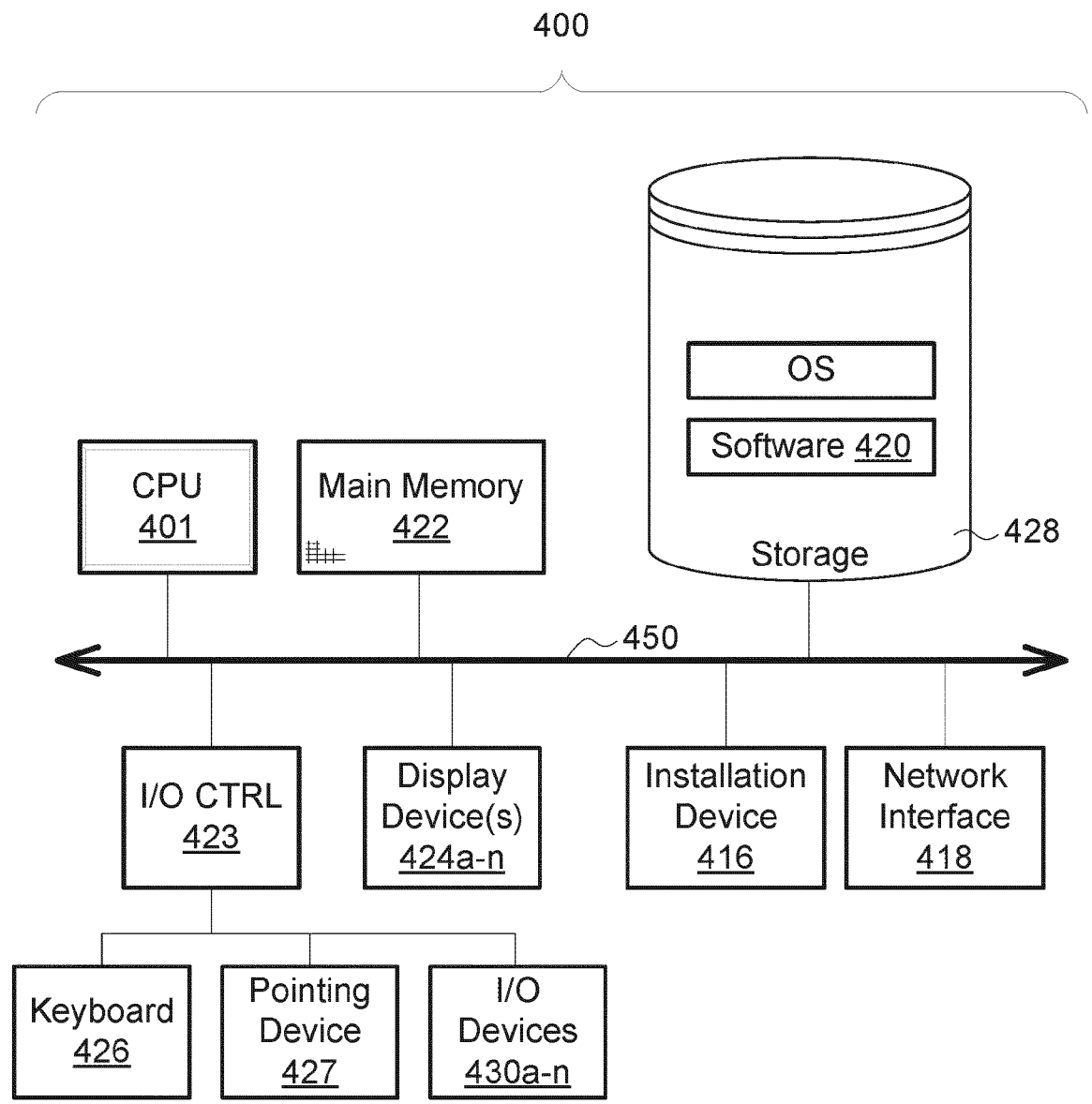
FIGS. 4A and 4B are block diagrams depicting embodiments of computing devices useful in connection with the methods and systems described herein.
Figure 4B:
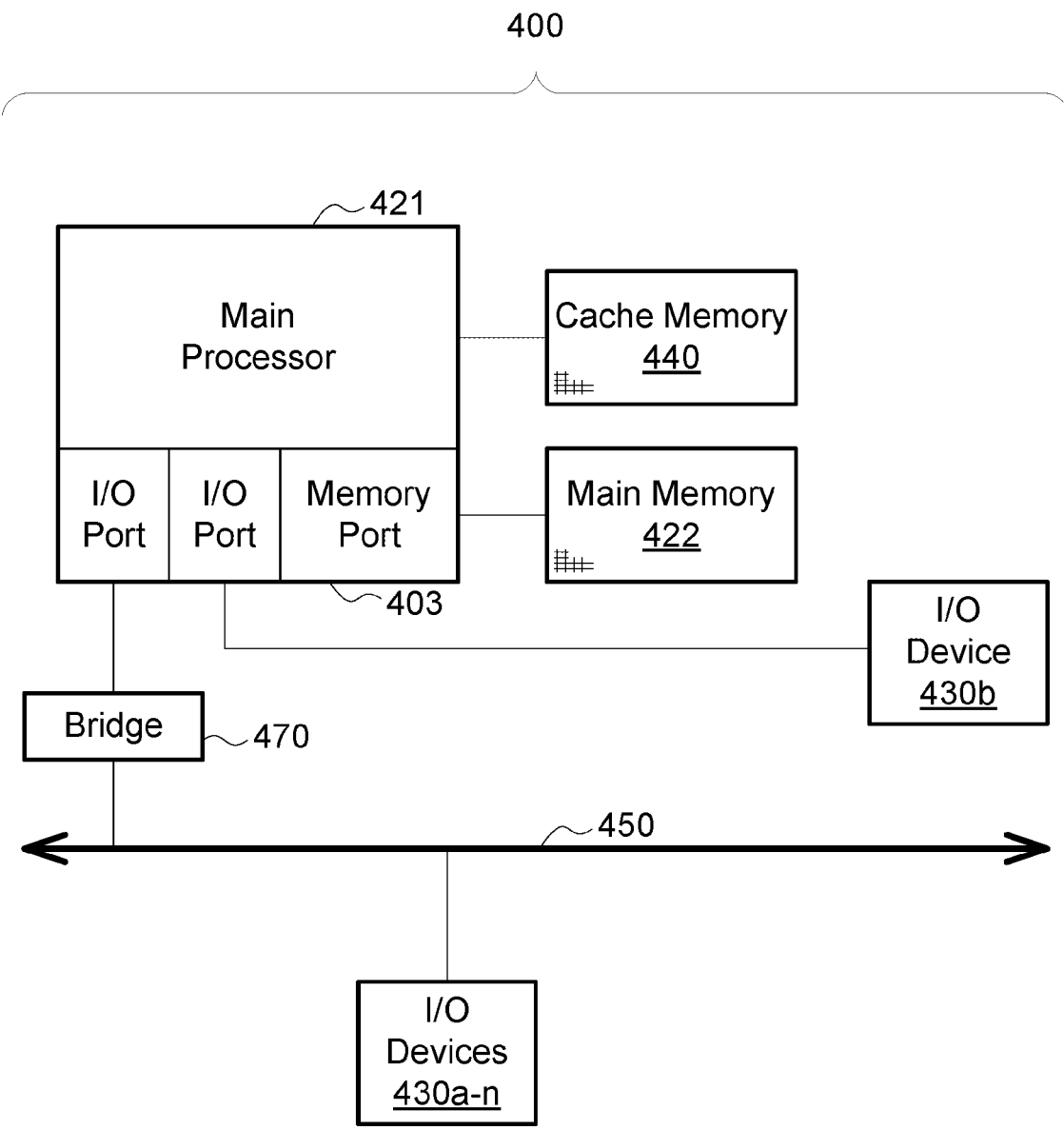

The content server 106, the one or more overhead terminals 108a-108n, the one or more in-seat terminals 110a-110n, and the one or more passenger terminals 112a-112n can be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of The content server 106, the one or more overhead terminals 108a-108n, the one or more in-seat terminals 110a-110n, and the one or more passenger terminals 112a-112n. As shown in FIGS. 4A and 4B, each computing device 400 includes a processor 421, and a main memory unit 422. As shown in FIG. 4A, a computing device 400 can include a storage device 128, an installation device 416, a network interface 418, an I/O controller 423, display devices 424a-424n, and/or a keyboard 426 and a pointing device 427, such as a mouse. The storage device 128 can include, without limitation, an operating system and/or software. As shown in FIG. 4B, each computing device 400 can also include additional optional elements, such as a memory port 403, a bridge 470, one or more input/output devices 430a-430n (generally referred to using reference numeral 430), and a cache memory 440 in communication with the central processing unit 421.

The processor 421 may include any logic circuitry that responds to and processes instructions fetched from the main memory unit 422. The processor 421 may sometimes be referred to as a microprocessor or central processing unit. The processor 421 may include, for example, a single or multi-core processor, digital signal processor, field programmable gate array (FPGA) device, application specific integrated circuit (ASIC), or combinations thereof. The computing device 400 can be based on one of more of these processors, or any other processor capable of operating as described herein.

Main memory unit 422 can be one or more memory chips capable of storing data and allowing any storage location to be directly accessed by the processor 421, such as any type or variant of Static random access memory (SRAM), Dynamic random access memory (DRAM), Ferroelectric RAM (FRAM), NAND Flash, NOR Flash and Solid State Drives (SSD). The main memory 422 can be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor 421 communicates directly with main memory 422 via a memory port 403. For example, in FIG. 4B the main memory 422 can be DRDRAM.

FIG. 4B depicts an embodiment in which the processor 421 communicates directly with cache memory 440 via a secondary bus, sometimes referred to as a backside bus. In some embodiments, the processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses can be used to connect the processor 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 can use an Advanced Graphics Port (AGP) to communicate with the display 424. FIG. 4B depicts an embodiment of a computer 400 in which the processor 421 can communicate directly with an I/O device 430b, for example via HYPERTRANSPORT, RAPIDIO, or INFINIBAND communications technology. FIG. 4B also depicts an embodiment in which local busses and direct communication are mixed: the processor 421 communicates with I/O device 430a using a local interconnect bus while communicating with I/O device 430b directly.

A wide variety of I/O devices 430a-430n can be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 423 as shown in FIG. 4A. The I/O controller can control one or more I/O devices such as a keyboard 426 and a pointing device 427, e.g., a mouse or optical pen. Further, an I/O device can also provide storage and/or an installation medium 416 for the computing device 400. In still other embodiments, the computing device 400 can provide USB connections (not shown) to receive handheld USB storage devices such as the USB Flash Drive line of devices manufactured by Twintech Industry, Inc. of Los Alamitos, California Referring again to FIG. 4A, the computing device 400 can support any suitable installation device 416, such as a disk drive, a CD-ROM drive, a CD-R/RW drive, a DVD-ROM drive, a flash memory drive, secure digital (SD) device, tape drives of various formats, USB device, hard-drive, a network interface, or any other device suitable for installing software and programs. The computing device 400 can further include a storage device, such as one or more hard disk drives or redundant arrays of independent disks, for storing an operating system and other related software, and for storing application software programs such as any program or software 420 for implementing (e.g., built and/or designed for) the systems and methods described herein. Optionally, any of the installation devices 416 could also be used as the storage device. Additionally, the operating system and the software can be run from a bootable medium.

Furthermore, the computing device 400 can include a network interface 418 to interface to the network through a variety of connections including, but not limited to, standard telephone lines, LAN or WAN links (e.g., 802.11, satellite), broadband connections (e.g., Frame Relay, Gigabit Ethernet), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 can include a built-in network adapter, network interface card, peripheral connection interconnect express (PCIe) adaptor, PCMCIA network card, card bus network adapter, wireless network adapter, USB network adapter, modem or any other device suitable for interfacing the computing device 400 to any type of network or device capable of communication and performing the operations described herein.

In some embodiments, the computing device 400 can include or be connected to one or more display devices 424a-424n. As such, any of the I/O devices 430a-430n and/or the I/O controller 423 can include any type and/or form of suitable hardware, software, or combination of hardware and software to support, enable or provide for the connection and use of the display device(s) 424a-424n by the computing device 400. For example, the computing device 400 can include any type and/or form of video adapter, video card, driver, and/or library to interface, communicate, connect or otherwise use a display device 424.

In further embodiments, an I/O device 430 can be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 400 of the sort depicted in FIGS. 4A and 4B can operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, media storing device, media loading device, a gaming system, mobile computing device, or any other type and/or form of computing, telecommunications or media device that is capable of communication. The computer system 400 has sufficient processor power and memory capacity to perform the operations described herein.

In some embodiments, the computing device 400 can have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California More-over, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein. It should be noted that certain passages of this disclosure can reference terms such as "first" and "second" in connection with devices, etc., for purposes of identifying or differentiating one from another or from others. These terms are not intended to merely relate entities temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for providing in-flight entertainment related content, comprising:
   a plurality of client terminals operating in a passenger cabin of an aircraft, comprising a plurality of in-seat client terminals and a plurality of overhead client terminals; and
   a content server operating in the aircraft, configured to:
      upload first content to the plurality of in-seat client terminals for local storage and subsequent playback at each in-seat client terminal; and
      upload second content to the plurality of overhead client terminals for local storage and subsequent playback at each overhead client terminal, each client terminal of the plurality of in-seat client terminals and the plurality of overhead client terminals configured to synchronize to a defined reference point for initiating playback of the first content and of the second content, and to operate independently of each other and the content server subsequent to initiation of the playback,
      wherein subsequent to the initiation of the playback and in response to a system disruption to the playback at a first client terminal of the plurality of in-seat client terminals or the plurality of overhead client terminals, the first client terminal is configured to:
      determine, subsequent to the occurrence of the system disruption, an integrity status of the corresponding content stored on the first client terminal, the integrity status configured to indicate whether at least a portion of the corresponding content is at least one of missing or corrupt;
      identify a second client terminal from the plurality of client terminals, wherein the second client terminal is identified based on the second client terminal being closest in proximity to the first client terminal amongst the plurality of client terminals, to which to request corresponding content that is affected by the local disruption, the second client terminal operating independently of the first client terminal that is affected by the local disruption;
   transmit a request to the second client terminal identified from the plurality of client terminals for the corresponding content, the request indicating a point at which the local disruption occurred at the first client terminal; and
   resume the playback of the corresponding content at the point at which the disruption occurred using the corresponding content rom the second client terminal of the plurality of client terminals.

2. The system of claim 1, wherein the client terminal is further configured to:
   determine, in response to a request to playback third content at the client terminal, that upload of the third content to the client terminal for local storage is not complete; and
   request streaming of the third content from the content server to initiate the playback, responsive to the determination.

3. The system of claim 2, wherein the client terminal is further configured to:
   playback the third content via streaming from the content server; and
   concurrent to the streaming, upload at least a portion of the third content for local storage at the client terminal, via data transfer from the content server separate from the streaming.

4. The system of claim 1, wherein the plurality of client terminals further comprises a plurality of passenger client terminals, and
   wherein the content server is further configured to stream, on demand, third content to at least one passenger client terminal of the plurality of passenger client terminals for playback independent of other client terminals of the plurality of client terminals.

5. The system of claim 1, wherein the content server is further configured to upload the first content to each in-seat client terminal of the plurality of in-seat client terminals according to an order of upload based on relative proximity of each of the in-seat client terminals to the content server.

6. The system of claim 1, wherein the first content includes audio content and the second content includes video content.

7. A system for providing in-flight entertainment related content, comprising:
   an overhead client terminal operating in a passenger cabin of an aircraft, the overhead client terminal configured to download, from a content server, first content for local storage and subsequent playback at the overhead client terminal; and
   an in-seat client terminal operating in the passenger cabin of the aircraft, the in-seat client terminal configured to download, from the content server, second content for local storage and subsequent playback at the in-seat client terminal, wherein the overhead client terminal and the in-seat client terminal are configured to synchronize to a defined reference point for initiation of playback of the first content and the second content, and to operate independently of each other and of the content server subsequent to the initiation of the playback, and wherein subsequent to the initiation of the playback and in response to a system disruption of the playback of the corresponding content at the first client terminal of the plurality of in-seat client terminals or the plurality of overhead client terminals, the first client terminal is configured to:

determine, subsequent to the occurrence of the system disruption, an integrity status of the corresponding content stored on the first client terminal, the integrity status configured to indicate whether at least a portion of the corresponding content is at least one of missing or corrupt, identify a second client terminal from the plurality of client terminals, wherein the second client terminal from the plurality of client terminals, wherein the second client terminal is identified based on the second client terminal being closest in proximity to the first client terminal amongst the plurality of client terminals, to which to request corresponding content independently of the first client terminal that is affected by the local disruption; and transmit a request to the second client terminal identified from the plurality of client terminals for the corresponding content, the request indicating a point at which the local disruption occurred at the first client terminal; and resume the playback of the corresponding content at the point at which the disruption occurred using the corresponding content rom the second client terminal of the plurality of client terminals.

8. The system of claim 7, wherein the in-seat client terminal is further configured to:

receive, during downloading of third content from the content server, a request to playback the third content; and stream, responsive to the receipt of the request to playback the third content, the third content from one of the content server or a client terminal proximate to the in-seat client terminal, to initiate playback, separate from the downloading of the third content.

9. The system of claim 7, wherein the in-seat client terminal is further configured to:

receive, prior to completion of the downloading of the second content from the content server, a request to playback the second content; and stream, responsive to the receipt of the request to playback, the second content from one of the content server or a client terminal proximate to the in-seat client terminal, to initiate playback, separate from the downloading of the second content.

10. The system of claim 7, wherein the in-seat client terminal includes an in-seat display unit and an in-seat audio unit and is configured to download the second content including second video content and audio content, and wherein the overhead client terminal includes an overhead display unit and is configured to download the first content including first video content.

11. A method of providing in-flight entertainment related content, comprising:

uploading, by a content server operating in an aircraft, to each client terminal of a plurality of client terminals operating in a passenger cabin of the aircraft, content for local storage and subsequent playback at the respective client terminal, each client terminal synchronized with one another to a defined reference point, each client terminal including a content player for initiating playback, and operating independently of one another and of the content server subsequent to initiating the playback;

identifying, by the content server, a point at which a system disruption occurred at a first client terminal from the plurality of client terminals during the playback of the content at the first client terminal; and transmitting, responsive to the system disruption at the first client terminal, a command to the first client terminal causing the first client terminal to:

determine, by the content server, an integrity status of the corresponding content stored on the first client terminal subsequent to the occurrence of the system disruption, wherein the integrity status is configured to indicate at whether at least a portion of the corresponding content is at least one of missing or corrupt;

identify a second client terminal from the plurality of client terminals, wherein the second client terminal is identified based on the second client terminal being closest in proximity to the first client terminal amongst the plurality of client terminals, to which corresponding content that is affected by the local disruption, the second client terminal operating independently of the first client terminal that is affected by the local disruption;

transmit a request to the second client terminal identified from the plurality of client terminals for the corresponding content, the request indicating the point at which the system disruption occurred; and resume the playback of the content from the point at which the system disruption occurred at the first client terminal using the content streamed from the second client terminal of the plurality of client terminals.

12. The method of claim 11, wherein uploading the content further comprises:

uploading audio content to a first subset of the plurality of client terminals, each of the first subset of client terminals including an in-seat client terminal;

uploading visual content to a second subset of the plurality of client terminals, each of the second subset of client terminals including an overhead client terminal; and uploading audiovisual content to a third subset of the plurality of client terminals, each of the third subset of client terminals including a passenger client terminal.

13. The method of claim 11, further comprising:

identifying, by the content server, an order of upload of the content onto each client terminal of the plurality of client terminals based on a relative proximity of each client terminal of the plurality of client terminals to the content server; and wherein uploading the content further comprises uploading the content to each client terminal of the plurality of client terminals in accordance with the order of upload.

14. The method of claim 11, further comprising:

receiving, by the content server, from a second client terminal of the plurality of client terminals, a request to stream second content to initiate playback, the request to stream the second content transmitted by the second client terminal responsive to determining that the second content is not uploaded at the second client terminal; and streaming, by the content server, to the second client terminal, the second content responsive to receive the request to stream the second content, concurrent to uploading the content to the second client terminal.

\* \* \* \* \*